UNITED STATES PATENT OFFICE.

HENRY C. PRITCHARD, OF COLFAX TOWNSHIP, MECOSTA COUNTY, MICHIGAN, ASSIGNOR OF ONE-HALF TO DOUGLAS ROBEN, OF BIG RAPIDS, MICHIGAN.

MIXED PAINT.

1,000,943.  Specification of Letters Patent.  Patented Aug. 15, 1911.

No Drawing.  Application filed December 2, 1910. Serial No. 595,289.

*To all whom it may concern:*

Be it known that I, HENRY C. PRITCHARD, a citizen of the United States, residing in the township of Colfax, in the county of Mecosta and State of Michigan, have invented new and useful Improvements in Mixed Paints, of which the following is a specification.

The object of my invention is to make a paint which will give a hard, lustrous and durable surface, capable of withstanding the elements longer than other paints in common use; and which will therefore form a superior protection to wood, metal, brick, stone and cement. Its use will also tend to cheapen paints, as it can be manufactured at a less cost than almost any other good paint.

The chemicals ordinarily used as driers, and the acids used in leads are injurious to the paint. This invention uses only a minimum of such chemicals.

As one of the foundation ingredients I use the slag, dross or cinders from iron smelters. This is ground to a fine powder. It is silicious in substance, and gives to paint when applied, a certain brightness of appearance, and makes it of a hard, flinty nature. When used alone as the body of the paint it makes the paint nearly transparent; for that reason I generally combine it with white lead, zinc or other substance suitable for the body of the paint. The hardness of the powdered slag makes it peculiarly suitable for use in painting on brick, stone, cement and metals. It does not "chalk off" as do lead paints.

*Body of paint.*—Pulverized slag of iron smelting, 267 lbs.; white lead or oxid of zinc, 400 lbs.

*Liquid portion.*—Boiled linseed oil, 50 gals.; rice, 25 lbs.; water, 65 gals.; gum shellac, 15 lbs.; water, 10 gals.; potash, 2 lbs.; rosin, 25 lbs.; gasolene, 10 gals. The said 25 lbs. of rice are boiled in the 65 gallons of water till the substance is out of the rice. When the whole is strained I have 30 gallons of rice liquid. To the 10 gals. of water above mentioned I add said 15 lbs. of gum shellac and said 2 lbs. of potash. I heat this over a slow fire till the shellac is dissolved. The rosin is dissolved in said 10 gallons of gasolene. I mix the rice liquid with the shellac liquid. I add the boiled linseed oil, (50 gals.) and the rosin-gasolene solution, mixing all together over a slow fire.

The pulverized slag and lead or zinc are mixed together in any suitable mixer; and then all the ingredients, powder and liquid, are ground together in a paint mill to the consistency of liquid paint: making in this case something over 100 gallons of paint. Coloring matter is added to make any shade that may be desired.

The rice liquid, in addition to being a good drier, is particularly valuable as a blender, combining the other elements to the best consistency, and securing a smoothness of application and an evenness of surface when the paint is dried. It also adds a fine hard gloss and brightness to the painted surface; and with the action of the other ingredients this luster is maintained for a remarkably long time.

It is the ordinary custom before painting to go over knots and places where pitch is in evidence, with a shellac solution. But with this paint this is not necessary; the shellac and potash in the paint being sufficient to neutralize the pitch.

The formula given above, together with the method of combining the ingredients, is believed by me to produce the best results; nevertheless I do not limit myself to the particular ingredients mentioned, nor to the exact proportions of the same, nor to the method described for combining them.

The pulverized slag, with or without the lead or zinc, may be used in combination with lignite, ocher, umber, clay, marl, or other substance or substances in common use for the body of paints; and may be mixed with linseed oil, and any of the ordinary driers used. If the slag is used in greater proportion, the paint is rendered more transparent; if the other body substances predominate, the paint is made more opaque.

The rice liquid with a small quantity of potash, will combine with boiled linseed oil, and the combination may be used with or without the shellac, water, rosin, and gasolene, or any of them, to mix with any of the dry or paste paints in ordinary use, with or without the pulverized slag.

What I claim as new, and wish to secure by Letters Patent is as follows:

A paint formed of pulverized slag from iron smelting, with white lead; with which are combined the liquid obtained from boiling rice; shellac; potash; water; rosin; gasolene; and boiled linseed oil; all in about the proportions stated: applicable for the protection or preservation of wood, metal, brick, stone and cement.

HENRY C. PRITCHARD.

Witnesses:
SAML. J. THROP,
CHAS. H. THROP.